(12) United States Patent  
Amos

(10) Patent No.: US 6,947,971 B1  
(45) Date of Patent: Sep. 20, 2005

(54) ETHERNET PACKET HEADER CACHE

(75) Inventor: James A. Amos, North Canton, OH (US)

(73) Assignee: Cisco Technology, Inc., San Jose, CA (US)

(*) Notice: Subject to any disclaimer, the term of this patent is extended or adjusted under 35 U.S.C. 154(b) by 311 days.

(21) Appl. No.: 10/141,709

(22) Filed: May 9, 2002

(51) Int. Cl.[7] .................................... G06F 13/00
(52) U.S. Cl. ................. 709/213; 709/218; 709/238; 711/120
(58) Field of Search .................. 709/218, 213, 709/238; 711/118, 122, 119, 120

(56) References Cited

U.S. PATENT DOCUMENTS

| | | | |
|---|---|---|---|
| 6,018,763 A | 1/2000 | Hughes et al. | 709/213 |
| 6,076,147 A | 6/2000 | Lynch et al. | 711/146 |
| 6,427,170 B1 * | 7/2002 | Sitaraman et al. | 709/226 |
| 6,751,704 B2 * | 6/2004 | Ng | 711/120 |
| 2002/0174252 A1 * | 11/2002 | Hayter et al. | 709/250 |

OTHER PUBLICATIONS

Jim Handy, The Cache Memory Book, Academic Press, Inc., 1993, pp 62-65.*

* cited by examiner

Primary Examiner—Hong Kim  
(74) Attorney, Agent, or Firm—Cindy Kaplan

(57) ABSTRACT

Methods and apparatus for caching information associated with packets are disclosed. According to one aspect of the present invention, a system for processing a packet includes a controller with a processor and a controller data cache, a bus, a memory interface, and a separate data cache. The memory interface may be accessed by the controller via the bus, and is arranged to be in communication with a substantially external memory. The separate data cache, which is also in communication with the controller via the bus, caches information associated with the packet such that the controller accesses the separate data cache to obtain the information associated with the packet when the controller needs to decide how to process the packet.

29 Claims, 7 Drawing Sheets

ETHERNET PACKET HEADER CACHE

BACKGROUND OF THE INVENTION

1. Field of Invention

The present invention relates generally to data communication systems. More particularly, the present invention relates to systems and methods for efficiently routing packets through access points.

2. Description of the Related Art

The demand for data communication services is growing at an explosive rate. Much of the increased demand is due to the fact that as the use of computing devices becomes more prevalent, the need for creating networks of computing devices such that resources may be shared between the computing devices also increases. Typically, wired networks such as local area networks (LANs) are used to enable computing devices within an organization to communicate with each other.

Many organizations which use LANs also use wireless devices that communicate with the LANs. The use of wireless devices such as personal digital assistants (PDAs) and laptop computers enables users of the devices to use the devices in different locations substantially without losing access to computing resources on a LAN. For example, a user of a laptop computer within an organization may use his or her laptop at a first location within a building, then move to a second location within the building. Although the user may physically connect the laptop computer to the LAN using a wired connection at the first and second locations, while the user is "roaming," or moving, the laptop computer is a roaming device which may not be physically wired to the LAN.

In order to enable roaming devices to communicate with a LAN, access points are used. Access points are arranged to interface with conventional, i.e., wired, LANs in order to effectively create a wireless LAN. FIG. 1 is a diagrammatic representation of a wireless LAN that includes access points. A wireless LAN 100 includes a wired LAN 104 which, as will be appreciated by those skilled in the art, generally includes computing devices such as clients and servers which are networked together in a wired network. LAN 104 is in communication with a router 108 across a connection 112. It should be appreciated, however, that the use of router 108 is optional.

Router 108 is connected to a plurality of access points 116 through wired connections 120. Access points 116 are effectively fixed devices which enable a roaming device 124 to communicate with LAN 104. That is, access points 116 are fixed in desired locations associated with LAN 104 to support communications between roaming device 124 and LAN 104. Access points 116 may be Aironet series access points available from Cisco Systems, Inc., of San Jose, Calif., although it should be understood that access points may be substantially any suitable access points.

Each access point 116 has a corresponding communications range 128. As shown, roaming device 124 is in communications range 128a of access point 116a. In general, the coverage associated with communications range 128a may vary widely. By way of example, communications range 128a may extend to approximately 150 feet in any direction from access point 116a. That is, communications range 128a may have a radius of approximately 150 feet as measured from access point 116a.

Roaming device 124 communicates with access point 116a in a wireless manner, i.e., using wireless communications, when roaming device 124 is in communications range 128a. Typically, roaming device 124 includes a wireless networking card which enables roaming device 124 to communicate with access points 116. When roaming device 124 is in communications range 128a and attempts to access a resource within LAN 104, e.g., a database within LAN 104, roaming device 124 uses wireless communications to communicate with access point 116a which, in turn, communicates with LAN 104 through wired connections 102a, 104 and router 108, when router 108 is present.

Typically, access points 116 are considered to be bridges or nodes between an Ethernet domain, e.g., LAN 104, and a wireless domain, e.g., roaming device 124. Hence, when a packet is received on an access point 116, access point 116 typically determines how to forward the packet or dispose of the packet. In other words, access point 116 studies the packet to determine what to do with the packet.

With reference to FIG. 2, the processing of packets by an access point will be described. An access point 150 receives packets 160 and determines how to process the received packets 160. Packets 160 may be placed in a packet buffer (not shown) or otherwise queued. In general, while packets 160 may be processed on a first-in-first-out basis, packets 160 may also be prioritized such that packets 160 which include time-sensitive contents may be processed, e.g., processed using quality of service processing, before packets 160 which are not as time-sensitive.

Typically, access point 150 may either forward packets 160 to destinations 170, or dispose of packets 160. By way of example, when access point 150 determines that packet 160c is intended for destination 160b, access point 150 may route or otherwise provide content associated with packet 160c as a part of packet 160c' to destination 170b. Alternatively, when access point 150 determines that a packet 160 such as packet 160a is to be disposed of, e.g., when packet 160a is a quality of service packet and may not be delivered within a specified amount of time or has expired, access point 150 may dispose of packet 160a by not forwarding packet 160a to a destination 170.

In order to determine an appropriate destination 170 for each packet 160, access point 150 looks at or studies the header of each packet 160. The header of a packet 160, which may be approximately the first twenty-four bits associated with packet 160, includes information which indicates an appropriate destination 170 for packet 160. When access point 150 performs packet filtering to determine whether to forward or dispose of packets 160, access point 150 may either obtain cached information or information that is stored in an associated memory.

FIG. 3 is a diagrammatic representation of a conventional access point, e.g., access point 150 of FIG. 2, that is implemented as a single chip. Access point 150 includes a controller 201 which, in turn, includes processor 202, a data cache (D-cache) 204, an instruction cache (I-cache) 206, and a cache controller 208. D-cache 204 is arranged to cache data, while I-cache 206 is arranged to cache instructions. Processor 202, which may be a RISC central processing unit (CPU) or substantially any other type of CPU, may obtain an instruction from each of D-cache 204 and I-cache 206 with each clock cycle, as will be understood by those skilled in the art. Cache controller 208 may be associated with tags, which are held in a tag random access memory (RAM), and identify translations that are stored in external memory. In other words, tags identify address locations in external memory such that controller 201 may access appropriate locations within the external memory through external memory interface 212. Such appropriate locations may include storage locations which store information associated with a particular packet that is being processed.

A local bus 210 is arranged to facilitate the transfer of information between an external memory interface 212 of access point 150, an Ethernet interface 214 of access point 150, and caches 204, 206. External memory interface 212 is arranged to allow access point 150 to interface with an external memory such as a shared global memory in order to obtain translations used to substantially interpret the contents of headers of packets. Ethernet interface 214 is arranged to enable packets to be received from an external network and forwarded through the external network.

Information is often stored in caches 204, 206 because accessing information stored in external memory through external memory interface 212 is often time-consuming and expensive. D-cache 204, for example, may store header information such as a packet header, and mappings or translations which have recently been accessed with regards to processing packet headers. When a suitable mapping for a given packet is available in D-cache 204, processing the packet or, more particularly, the packet header may occur efficiently and with relatively low overhead, e.g., without accessing external memory or causing the main D-cache 204 to be updated.

Space within D-cache 204, however, is generally limited and, hence, is often cleared when software executing on processor 202 accesses other variables or data. In other words, packet headers or mappings may often be cleared from D-cache 204 such that when a packet header or a mapping that was previously in D-cache 204 is once again needed, the mapping must either be recreated or obtained from external memory. A process known as thrashing may occur when information that is needed is not available within D-cache 204. As will be appreciated by those skilled in the art, thrashing typically occurs when information is not available within D-cache 204, and an external memory is accessed to obtain the information which is then loaded into D-cache 204.

Further, D-cache 204 is often not coherent with respect to Ethernet packets. Cache coherence, as will be appreciated by those skilled in the art, typically means that cache control hardware tracks the accesses that a CPU makes within its address space. If the CPU attempts to access a location in memory, of the memory is marked as cachable, then the cache controller will typically update the cache line, i.e., a small block of cache whose size is typically aligned with the burst capabilities of a DRAM subsystem, that contains that location in the memory space. Hence, as a CPU operates, the cache is read and updated out of the system DRAM, or the cache is copied back out to the DRAM if the CPU has modified the variables in the cache. This is typically done automatically by the cache controller hardware. No intervention of the CPU is generally required for this to work properly, but all accesses to the system DRAM typically must be tracked by the cache controller. To keep processor speed substantially maximized, most variables and code are defined as cachable. As a result, most accesses to the external DRAM are cache updates, an indirect result of the current access of the CPU, and not the CPU directly accessing external memory.

When an Ethernet packet is received, the Ethernet packet is copied to the DRAM via an internal bus which uses bus mastering DMA. This is generally done without direct interaction from the main CPU. It may is typically also done without the knowledge of the cache controller. As a result, the Ethernet packet is generally not cache coherent because the system cache controller does not have knowledge of a variable update. If a variable is to be cached, as the variable generally will be if the variable is to be used more than once, the variable must be updated. When the CPU has a variable, e.g., an Ethernet header, that is not cache coherent but that the CPU wants cached, the CPU may manually force the cache controller to update that variable each time the CPU believes that the variable may be changed. Such updating is inefficient and uses substantially overhead on a main CPU, and effectively wastes CPU cycles.

Efficiently enabling packets to be routed through an access point is important to the performance of the access point, as well as the performance of the overall network which includes the access point. When packets are not processed efficiently, the speed associated with the overall network may be compromised. For example, as discussed above, when information associated with a packet header of a packet such as mapping information is not available in a data cache, the information may be obtained from an external memory, which requires a significant amount of overhead and is time-consuming. The delay associated with obtaining the information from the external memory, and loading the information into the data cache, may cause undesirable delays in forwarding the packet to a desired destination.

Therefore, what is needed is a system and a method for efficiently filtering packets received on an access point. That is, what is desired is a system and a method for efficiently caching information associated with a packet header such that needed information is substantially always available in a cache.

SUMMARY OF THE INVENTION

The present invention relates to caching information associated with packets. According to one aspect of the present invention, a system for processing a packet includes a controller with a processor and a controller data cache, a bus, a memory interface, and a separate data cache. The memory interface may be accessed by the controller via the bus, and is arranged to be in communication with a substantially external memory. The separate data cache, which is also in communication with the controller via the bus, caches information associated with the packet such that the controller accesses the separate data cache to obtain the information associated with the packet when the controller needs to decide how to process the packet. In one embodiment, the separate data cache may be in direct communication with the bus.

In another embodiment, the separate data cache includes a logic module for monitoring the bus determine when the information associated with the packet is present on the bus. In such an embodiment, the separate data cache may also include a random access memory that is suitable for caching the information associated with the packet.

A separate cache that is accessible to a controller within a system such as an access point enables information used to determine how to forward packets to be quickly and efficiently accessed, e.g., substantially without accessing an external memory. The information stored in the separate cache is stored in the separate cache when the separate cache determines that a packet buffer has been updated, and is generally not cleared when other variables and data are accessed by software associated with the controller. The accessibility of the information typically reduces the amount of thrashing performed on a packet header of a packet, and increases the efficiency of a processor included in the controller.

According to another aspect of the present invention, a method for processing a packet that includes at least a first bit involves monitoring a buffer associated with a controller that includes a processor and a first cache, and determining when information associated with the packet is present within the buffer. The method also includes updating a second cache using the information. The second cache is not a part of the controller, but is in communication with the controller to enable the controller to access the second cache to obtain the information in order to perform a function with the packet. In one embodiment, updating the second cache using the information includes writing at least the first bit into the second cache.

In another embodiment, the second cache includes a random access memory and a tag bit. Updating the second cache using the information in such an embodiment includes writing at least the first bit into the random access memory. The tag bit is typically also updated to indicate a corresponding location within a header cache table stored in an external memory.

According to still another aspect of the present invention, a method for processing a packet includes obtaining information associated with the packet. The information is obtained from a first cache that is substantially separate from a controller which includes a second cache. The method also includes determining whether to forward the packet using the information which substantially identifies a destination for the packet, and forwarding the packet when it is determined that the packet is to be forwarded. In one embodiment, the packet is disposed of when it is determined that the packet is not to be forwarded.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

A controller such as a RISC controller that is used to sort, route, forward, and prioritize packets generally includes a data cache. Since this cache is used to store a variety of information, the data cache is often updated. As a result, information which may be used by the controller to process packets may not be available in the data cache when the information is needed. When information such as packet header data is not available in the data cache, the controller may access main memory to obtain the information, then store the information into the data cache. That is, thrashing on packet header data may occur. When thrashing occurs, the efficiency with which a processor associated with the controller may operate decreases, and the overall efficiency within which packets may be sorted, routed, forwarded, or prioritized may be compromised.

In one embodiment, a separate cache which is Ethernet coherent and configured to handle Ethernet traffic may enable the efficiency with which packets are processed to be increased. Such a separate cache may detect when a packet buffer or queue has been updated by an Ethernet media access controller (MAC). When the separate cache determined that the packet buffer has been updated by an Ethernet MAC, the separate cache then updates itself accordingly. As a result a processor may have access to mappings associated with Ethernet packet headers, or Ethernet packet header data, in the separate cache at substantially any time.

The use of a separate cache that is accessible to a controller within an access point enables information used to determine how to forward packets and information used to determine how to prioritize packets to be quickly accessed, e.g., substantially without accessing a main or external memory. Since the separate cache is dedicated to storing information associated with a packet header, the separate cache is generally not cleared when other variables and data are accessed by software associated with the controller. As such, information within the separate cache remains readily accessible. The accessibility of the information generally reduces thrashing associated with the access point, and increases the efficiency of a processor associated with the controller.

Figure 1:
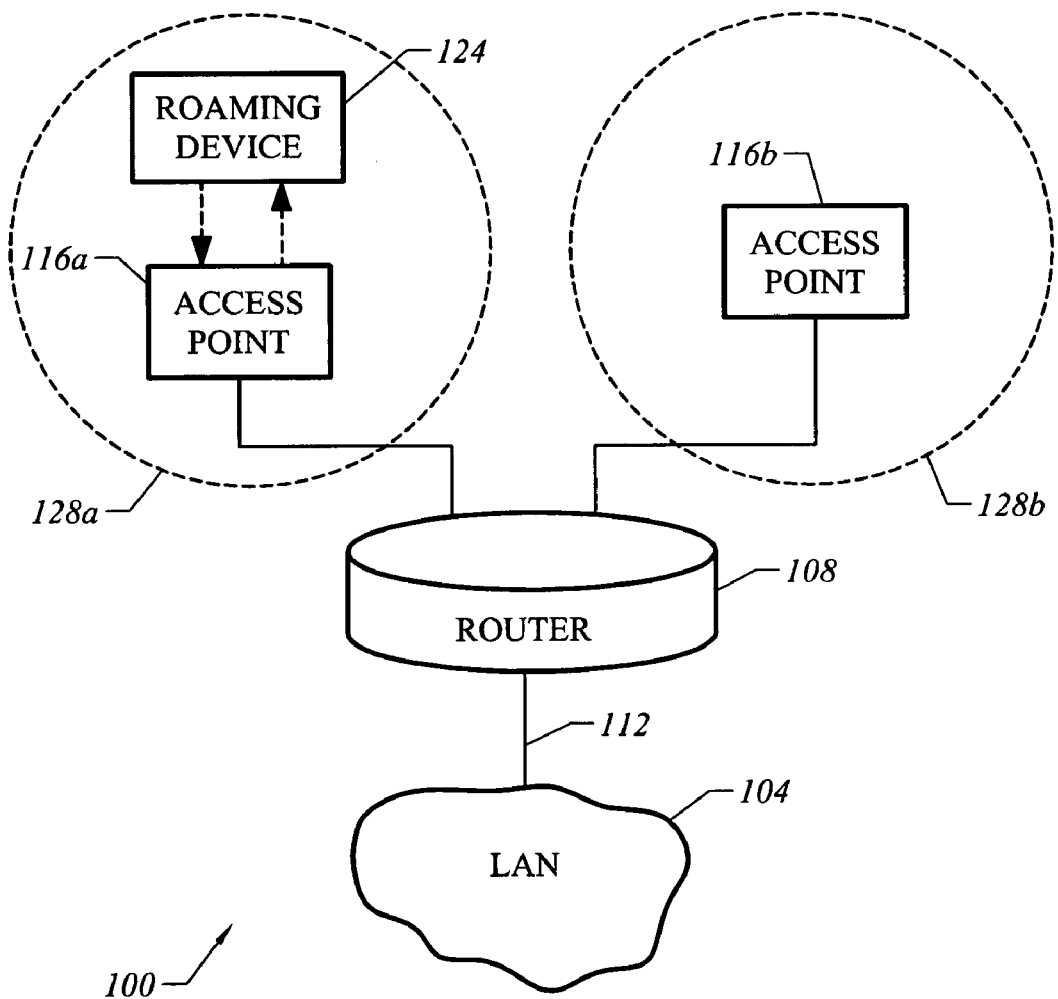
FIG. 1 is a diagrammatic representation of a system which includes access points.
Figure 2:
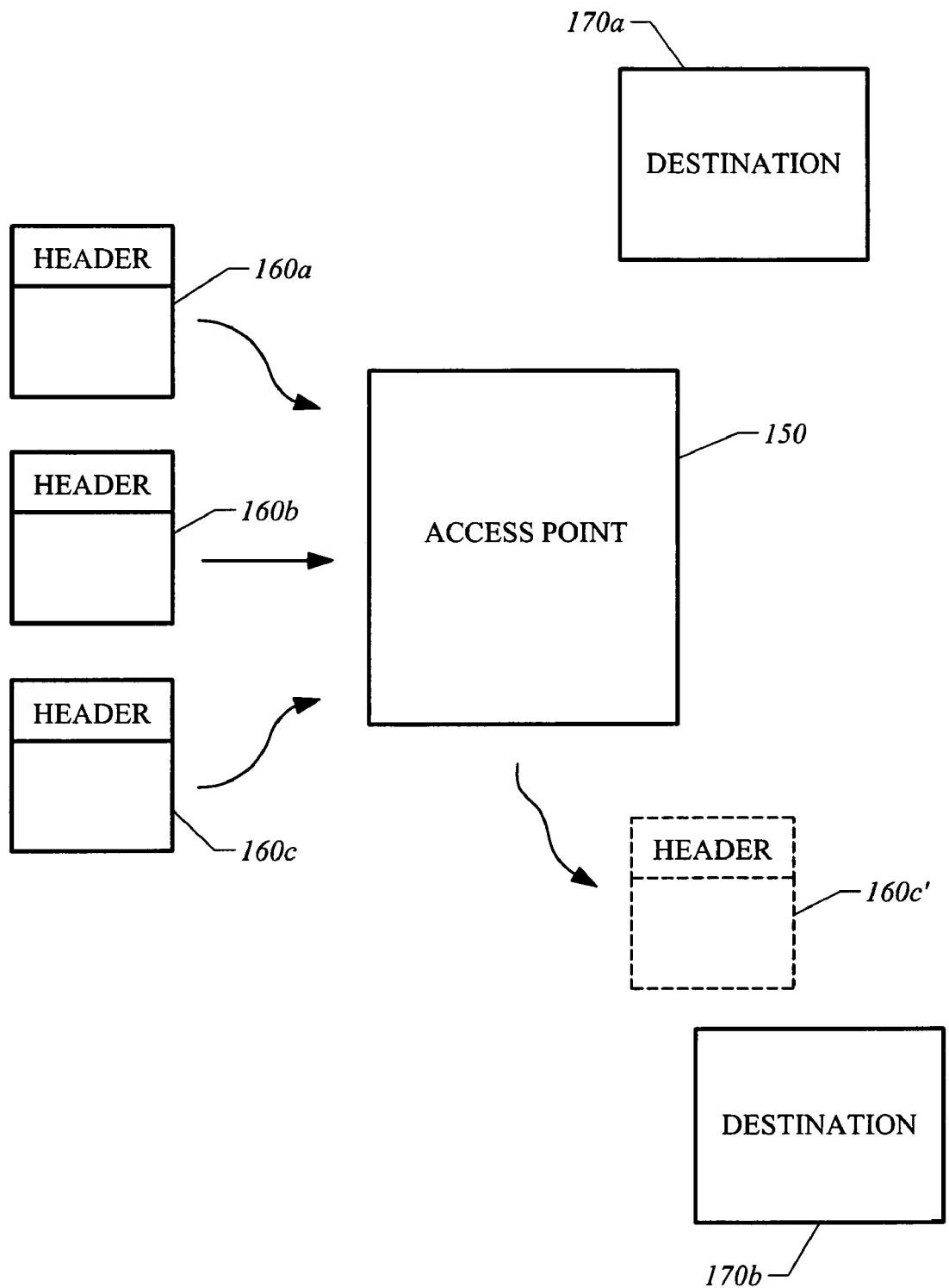
FIG. 2 is a diagrammatic block diagram representation of an access point within a network through which packets are forwarded.
Figure 3:
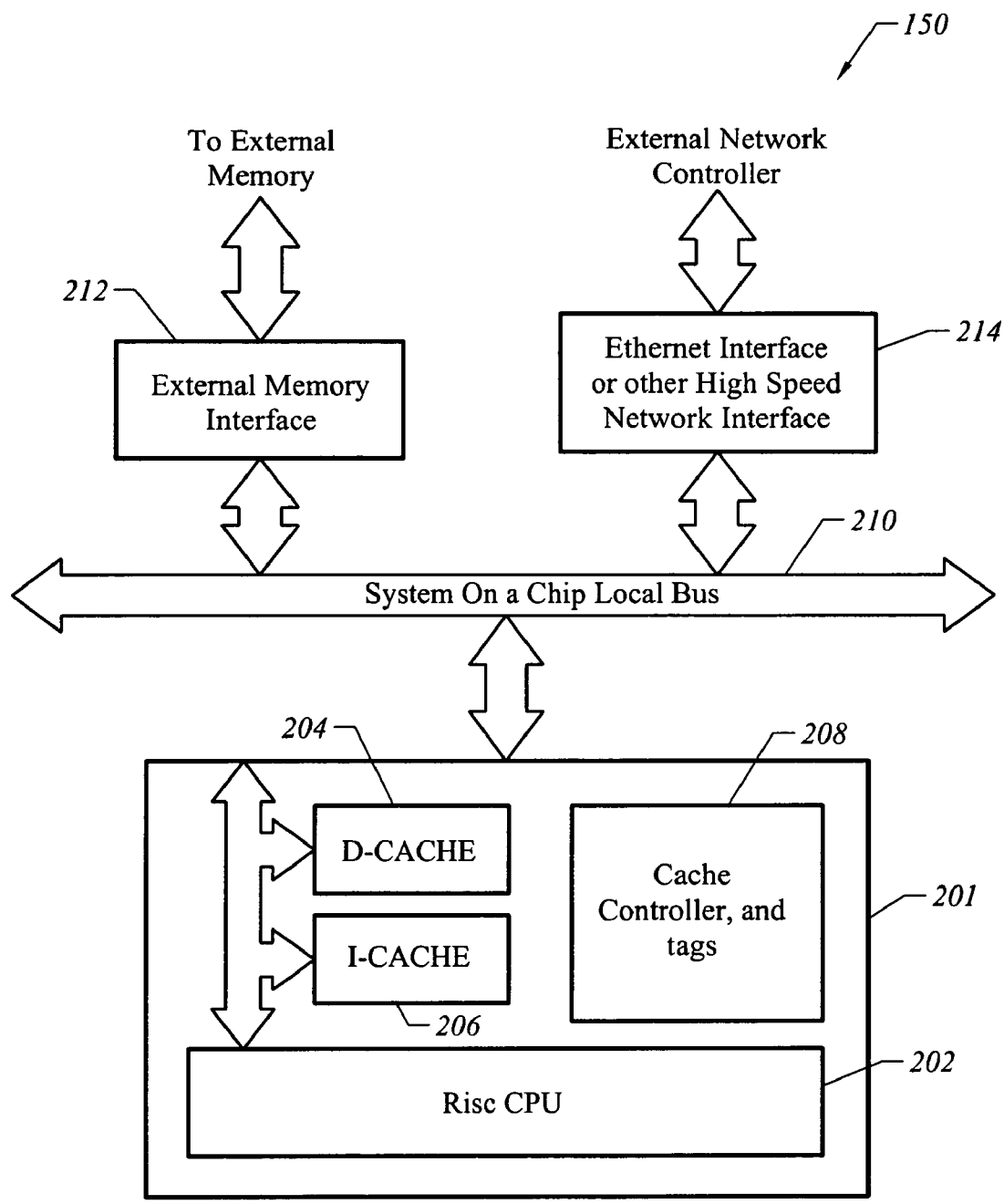
FIG. 3 is a diagrammatic representation of an access point, i.e., access point 150 of FIG. 2.
Figure 4:
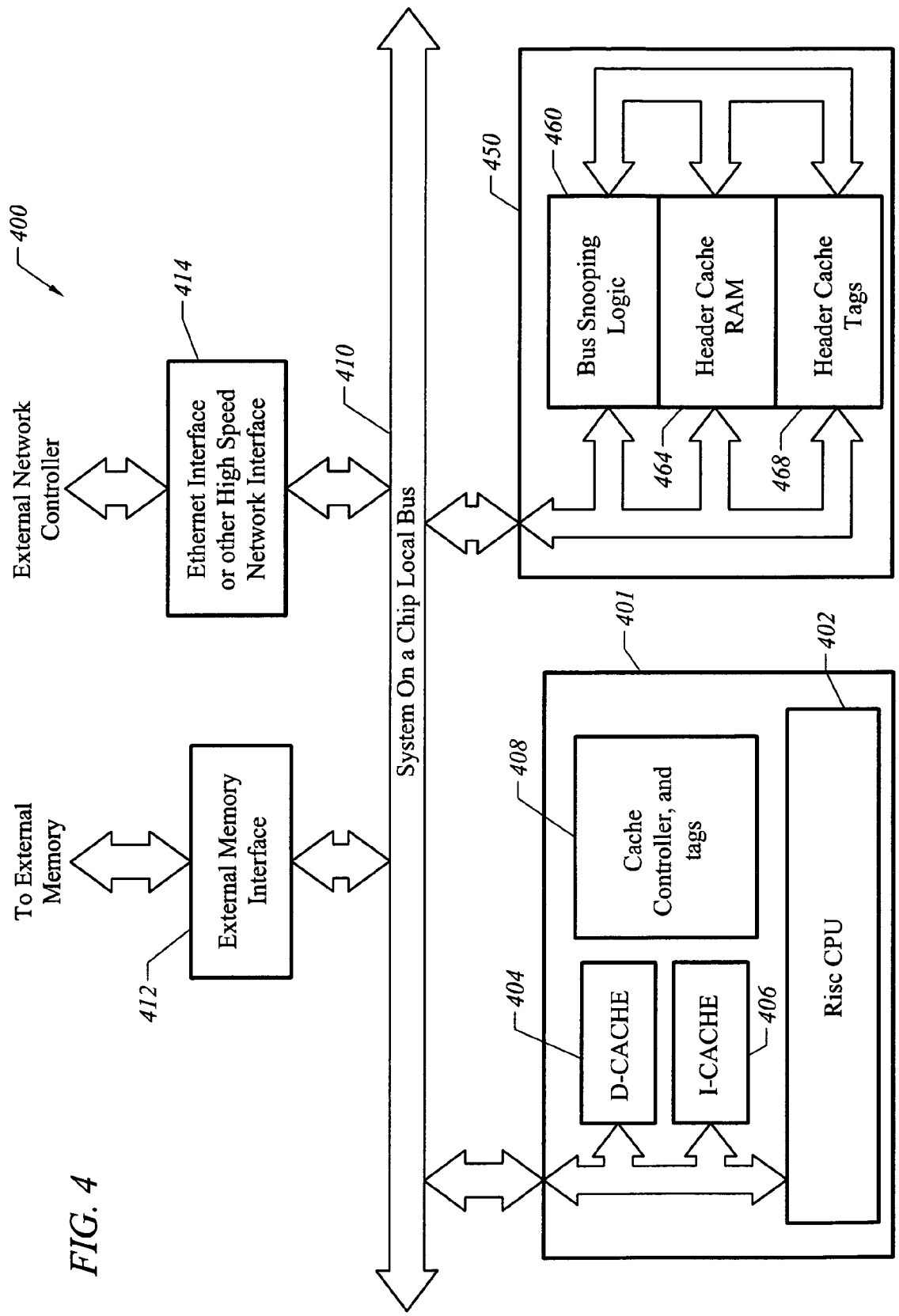
FIG. 4 is a diagrammatic representation of an access point which includes a separate packet header cache in accordance with an embodiment of the present invention.

FIG. 4 is a diagrammatic representation of an access point which includes a separate packet header cache in accordance with an embodiment of the present invention. An access point 400 includes a controller 401 that has a processor 402, a data cache (D-cache) 404, an instruction cache (I-cache) 406, and a cache controller 208. In the described embodiment, access point 400 is a single chip access point 400. Processor 402, e.g., a Risc central processing unit (CPU), may obtain information from each of D-cache 204 and I-cache 206 with each clock cycle, as will be understood by those skilled in the art. A local bus 410 is arranged to facilitate the transfer of information between an external memory interface 412 of access point 400, an Ethernet interface 414 of access point 400, and caches 404, 406. It should be appreciated that the information that is transferred on local bus 410 may take the form of data signals.

Access point 400 also includes a packet header cache 450, or a data cache which is separate from D-cache 404. Packet header cache 450 is arranged to store header information obtained from packets so that processor 402 has relatively easy access to the information to sort, forward, prioritize, and route packets. In the described embodiment, packet header cache 450 may be configured for Ethernet traffic. Packet header cache 450 may automatically be updated when a bus snooping logic module 460 determines that an Ethernet controller is updating memory locations that are associated with a buffer. As will be appreciated by those skilled in the art, a processor may set up buffers in memory at various locations. The start addresses of these buffers are generally passed to a bus mastering Ethernet controller to use as the starting address of buffers. Packet header cache 450, similarly, receives the start addresses, and updates its own internal copies of these locations when the addresses are being written by the Ethernet controller. Packet header cache 450 may determine when addresses are being written by the Ethernet controller by snooping such that packet header cache 450 intercepts values being written into memory, and store a separate copy. Alternatively, packet header cache 450 may instead determine when addresses are being written using separate read operations.

Packet header cache 450 includes bus snooping logic module 460, a header cache random access memory (RAM) 464, and header cache tags 468. Bus snooping logic module 460 is arranged to monitor bus 410 to determine when new packets have been added to a packet buffer or queue. Alternatively, in one embodiment, bus snooping logic module 460 may substantially directly monitor a packet buffer stored in an external memory. When bus snooping logic module 460 determines that the packet buffer has effectively been updated, then packet header cache 450 is updated. Specifically, the contents of header cache RAM 464 may be updated to include header information associated with new packets which have been added into the packet buffer.

Header cache RAM 464 is arranged to contain header information which enables access point 400 to route packets efficiently. By way of example, header cache RAM 464 may hold information which is conventionally held in D-cache 404 that may be used to map or otherwise translate packet header information such that packet headers may be disposed of or forwarded as expected. Unlike D-cache 404, however, information stored in header cache RAM 464 is generally available until the packet buffer is overwritten, or until processor 402 issues a flush command to clear the contents of header cache RAM 464. As a result, information within header cache RAM 464 is substantially always available for use by processor 402. Allowing a packet header and, hence, routing information, to be available within header cache RAM 464 may reduce the need to access an external memory through external memory interface 414.

Header cache tags 468 correspond to a header cache TAG table (not shown) which may be available in external memory. That is, header cache tags 468 may be created and maintained to allow a header cache TAG table to be indexed into. In general, a header cache TAG table is written by processor 402 during or after allocation of the packet buffer. The address of a packet within the packet buffer, and the size of a corresponding header of the packet, may be stored into the header cache TAG table. When packets are substantially all Ethernet packets, then the size of the corresponding Ethernet packet headers are all approximately the same size. In such an embodiment, i.e., an embodiment in which all packets in the packet buffer are Ethernet packets, the header cache TAG table may not necessarily include entries associated with the size of headers, as the headers will generally be of substantially the same size.

When controller 401 or, more generally, software executing on controller 401, is to perform an action involving a packet header, controller 401 may obtain information which may facilitate the action from packet header cache 450. The information may include, but is not limited to, packet header information, or information that may be used to sort packets, route packets, forward packets, and prioritize packets. Such information is added to packet header cache 450 such that the information is readily available to controller 401, and substantially eliminates the need for external memory to be accessed to obtain the information. Since the needed information is located in packet header cache 450 which, in one embodiment, is in direct communication with bus 410, thrashing on packet header data may be alleviated, as such information generally does not need to be obtained from external memory and loaded into D-cache 404.

Figure 5:
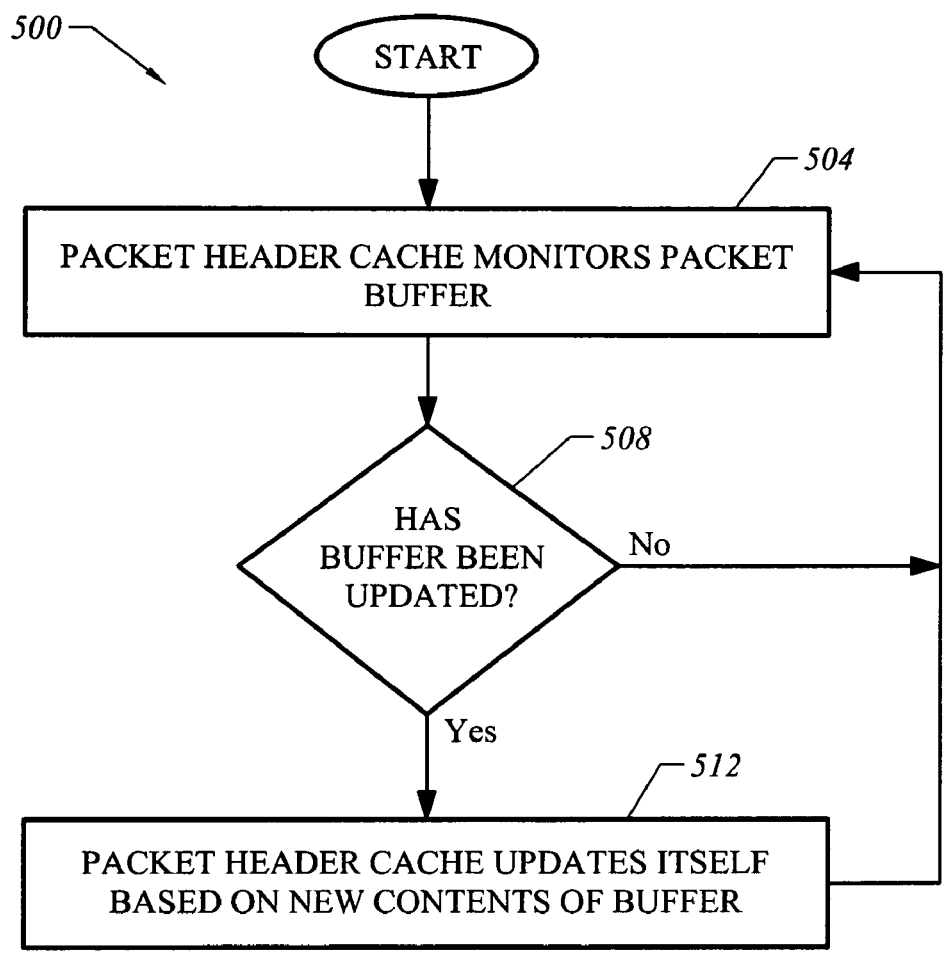
FIG. 5 is a process flow diagram which illustrates the steps executed by a packet header cache with regards to updating the packet header cache in accordance with an embodiment of the present invention.

As discussed above, bus snooping logic module 460 monitors local bus 410 to determine when a packet buffer has been updated, e.g., when a new packet has been added to the packet buffer. With reference to FIG. 5, the steps executed by a packet header cache with regards to monitoring a packet buffer and updating the packet header cache accordingly will be described in accordance with an embodiment of the present invention. A process 500 begins at step 504 in which a packet header cache monitors a packet buffer. In one embodiment, monitoring the packet buffer may include monitoring a local bus, e.g., bus 410 of FIG. 4, to determine when a new packet has been added to the packet buffer or, more generally, when the packet buffer has updated.

A determination is made in step 508 regarding whether the packet buffer has been updated. For example, a bus snooping logic module such as bus snooping logic module 460 of FIG. 4 may determine whether a change within the packet buffer has occurred through monitoring bus 410 of FIG. 4. A determination of whether a change within the packet buffer has occurred may include determining if a memory write command has been executed. If it is determined that the packet buffer has not been updated, as for example by an Ethernet MAC, then process flow returns to step 504 in which the packet header cache continues to monitor the packet buffer. Alternatively, if it is determined in step 508 that the packet buffer has been updated, then the packet header cache updates itself based on the new contents of the packet buffer in step 512. Updating the packet header cache may include updating header cache tags and writing information into a header cache RAM using data obtained by the bus snooping logic module. In one embodiment, the packet header cache may be updated to include a copy of the packet header. Once the packet header cache is updated, process flow returns to step 504 in which the packet header cache monitors the packet buffer.

The packet header cache may be accessed by a controller, as for example controller 401 of FIG. 4, when an action is to be undertaken on a packet. For instance, the packet header cache may be accessed when a determination is to be made regarding whether to forward a packet or to dispose of the packet. Such a determination is generally made based at least in part upon the contents of the packet header. The packet header cache may also be accessed when a packet is to be prioritized with respect to other packets in a queue.

Figure 6:
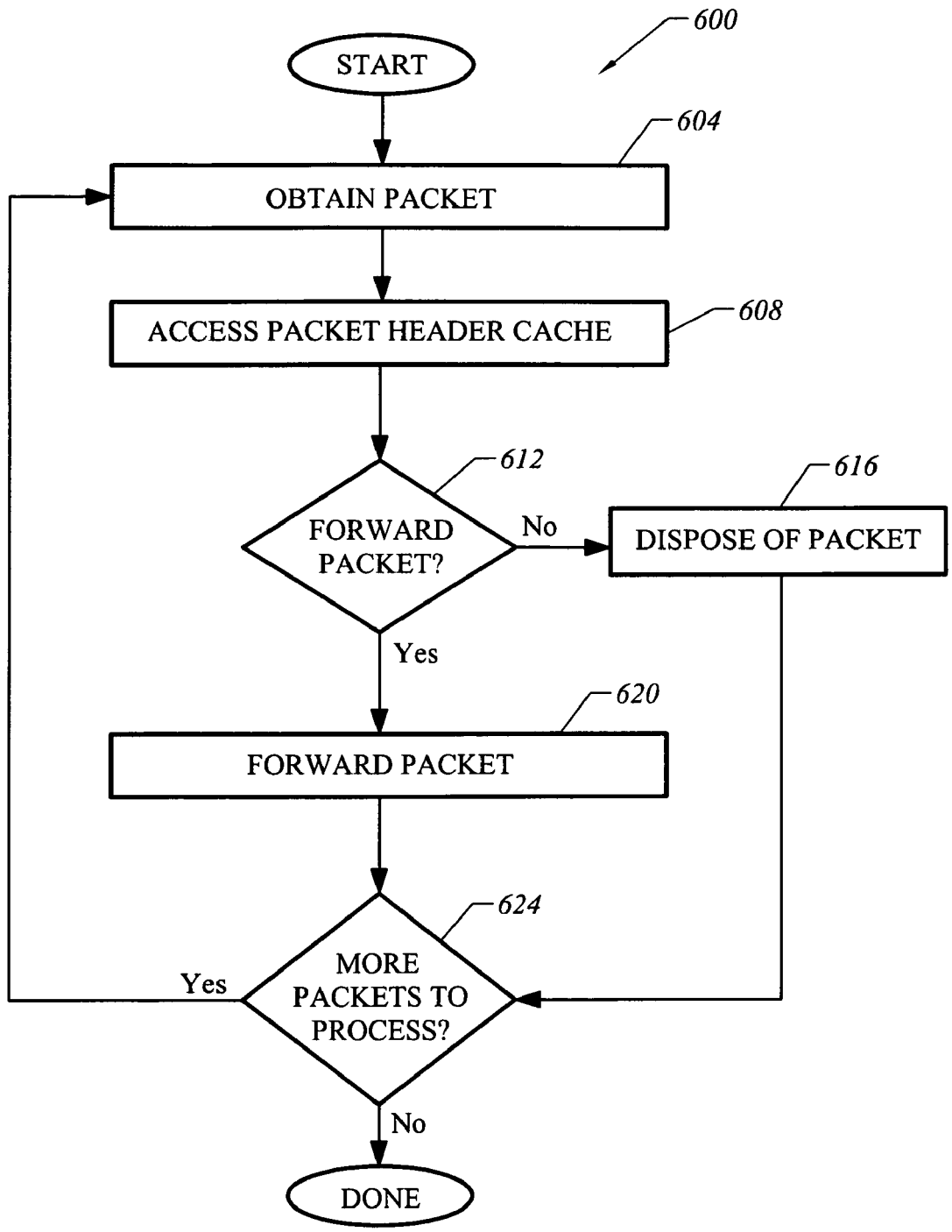
FIG. 6 is a process flow diagram which illustrates the steps associated with processing a packet within a system which includes a packet header cache in accordance with an embodiment of the present invention.

FIG. 6 is a process flow diagram which illustrates the steps associated with processing a packet within a system which includes a packet header cache in accordance with an embodiment of the present invention. For ease of discussion, processing a packet will be described to include forwarding or disposing of a packet. It should be appreciated, however, the processing a packet may also include prioritizing a packet. A process 600 of processing a packet begins at step 604 in which a packet that is to be processed is obtained by a controller. The packet may be obtained by software, or computer program code devices, executing with respect to the controller. Once the packet is obtained, a packet header cache that is accessible to the controller is accessed in step 608. Accessing the packet header cache may include accessing contents of RAM within the packet header cache and accessing header cache tags within the packet header cache.

After the packet header cache is accessed, e.g., to obtain or read information associated with the packet that is to be processed, a determination is made in step 612 regarding whether the information in the packet header cache indicates that the packet is to be forwarded. That is, it is determined whether the packet is to be forwarded to a particular destination within a network. If it is determined that the packet is not to be forwarded, the indication is that the packet is to be disposed of. The packet may generally be disposed of because the packet has expired, or a specified time within which the packet was expected to be delivered to a destination has elapsed. Accordingly, the packet is disposed of, or is not forwarded to an intended destination, in step 616.

Upon disposing of the packet in step 616, process flow proceeds to step 624 in which it is determined whether there are additional packets to process. If it is determined that there are additional packets to process, then process flow returns to step 604 in which another packet is obtained. Alternatively, if it is determined that there are no more packets to process, the process of processing a packet is completed.

Returning to step 612, if it is determined that the packet is to be forwarded, then the packet is forwarded to an appropriate destination, e.g., a destination indicated by information that was stored in the packet header cache, in step 620. The destination may either be a final destination for the packet that is identified by information within the packet header cache, or an intermediate destination which will facilitate the forwarding of the packet to the final destination. After the packet is forwarded in step 620, process flow moves to step 624 in which it is determined whether there are more packets to process.

Figure 7:
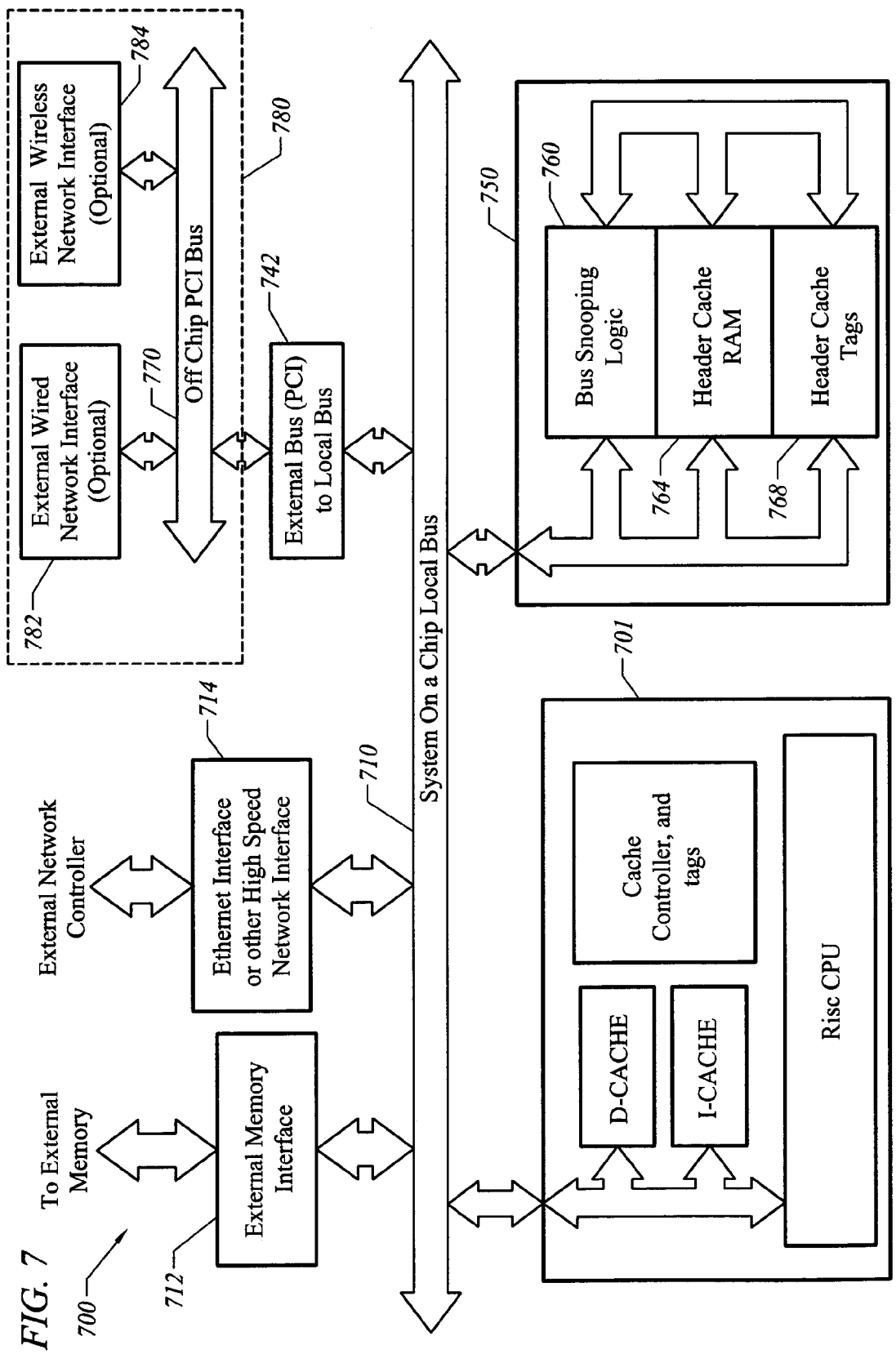
FIG. 7 is a diagrammatic representation of a single chip system, which includes a local bus and a packet header cache, and is in communication with an external bus in accordance with an embodiment of the present invention.

In one embodiment, a packet header cache may be implemented for use with respect to systems other than single chip access points. For example, a packet header cache may be implemented as a part of a single chip device that is in communication with an external bus such as a peripheral component interconnect (PCI) bus. The external bus may enable the single chip device to communicate with a radio MAC, an alternate Ethernet MAC, or substantially any other suitable wired network interface. Common networks include, but are not limited to, 10/100 Ethernet, Gigabit Ethernet, and substantially any other data oriented protocols which use packet structures. FIG. 7 is a diagrammatic representation of a single chip system, which includes a local bus and a packet header cache, and is in communication with an external bus in accordance with an embodiment of the present invention. A single chip system 700 includes a controller 701, a packet header cache 750, a local bus 710, an external memory interface, and an Ethernet interface 714. Single chip system 700 also includes an external bus to local bus interface 742 which allows local bus 710 to communicate with an external bus 770 that is a part of an external system 780. Interface 742 is, in one embodiment, a PCI bridge.

External system 780 may include an external wired network interface 782 and an external wireless network interface 784 which communicate via external bus 770, which may be a PCI bus. Information on external bus 770 may be provided through interface 742 to local bus 710, which bus snooping logic 760 included in packet header cache 750 may monitor in order to update contents of a header cache RAM 764 and to update header cache tabs 768.

Although only a few embodiments of the present invention have been described, it should be understood that the present invention may be embodied in many other specific forms without departing from the spirit or the scope of the present invention. By way of example, the present invention has generally been described in terms of Ethernet packets. That is, a packet header cache has been described as being suitable for use with regards to storing information associated with Ethernet packets. It should be appreciated, however, that the present invention may generally be used with respect to substantially any type of packet.

While a packet header cache has been described as being accessed in lieu of a D-cache or other cache which is included in a controller when Ethernet packets are processed, the packet header cache may be used in conjunction with the cache that is included in the controller. For instance, a controller may first access the cache included in the controller to locate desired information. If the desired information is not located in the cache included in the controller, then the controller may access the packet header cache instead of external memory.

A packet header cache generally allows the efficiency of an access point to be improved. It should be appreciated, however, that a packet header cache may be implemented in other systems which cause packets to be processed. In other words, the use of a packet header cache is not limited to applications associated with access points. Generally, a packet header cache may be implemented for use in processing packets which are moving from a wireless domain to another wireless domain, packets which are moving from a wireless domain to a wired domain, and packets which are moving from a wired domain to another wired domain.

In general, the steps associated with methods of updating a packet header cache and processing packets which are received on an access point may be widely varied. Steps may be added, removed, altered, or reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A system for processing a packet, the system comprising:
   a controller, the controller including a processor, a first data cache, and a cache controller;
   a bus;
   a memory interface, the memory interface being arranged to be accessed by the controller via the bus, the memory interface further being arranged to be in communication with an external memory; and
   a second data cache, the second data cache being arranged to be in communication with the controller via the bus, the second data cache being arranged to cache information associated with the packet when it is determined that the packet has been added into the external memory, wherein the controller accesses the second data cache to obtain the information associated with the packet.

2. The system of claim 1 wherein the second data cache further includes:
   a logic module, the logic module being arranged to monitor the bus determine when the information associated with the packet is present on the bus; and
   a random access memory, the random access memory being arranged to cache the information associated with the packet.

3. The system of claim 2 wherein the packet includes a header, and the information associated with the packet is information contained within the header.

4. The system of claim 1 wherein the second data cache is arranged to cache the information associated with the packet at approximately the same time the information associated with the packet is written into the memory.

5. The system of claim 1 wherein the system is an access point.

6. The system of claim 5 wherein the access point is a single chip access point.

7. The system of claim 1 wherein the packet is an Ethernet packet, and the second data cache is Ethernet coherent.

8. The system of claim 1 further including:
a network interface, the network interface being arranged to be accessed by the controller via the bus, the network interface further being arranged to be in communication with an external network controller.

9. The system of claim 1 wherein when the controller accesses the second data cache to obtain the information associated with the packet to determine whether to forward the packet through the network interface.

10. The system of claim 1 wherein the second data cache is arranged to be in direct communication with the controller via the bus.

11. A method for processing a packet, the packet including at least a first bit, the method comprising:
monitoring a buffer associated with a controller, the controller including a processor, a first cache, and a cache controller;
determining when information associated with the packet is present within the buffer; and
updating a second cache using the information when it is determined that the packet is present within the buffer, the second cache being external to the controller, wherein the controller is in communication with the second cache and arranged to access the second cache to obtain the information in order to perform a function with the packet.

12. The method of claim 11 wherein updating the second cache using the information includes writing at least the first bit into the second cache.

13. The method of claim 11 wherein the second cache includes a random access memory and a tag bit, and updating the second cache using the information includes writing at least the first bit into the random access memory and updating the tag bit.

14. The method of claim 11 wherein the controller is arranged to access the second cache to obtain the information in order to determine whether to forward the packet or to dispose of the packet.

15. The method of claim 11 wherein the second cache includes a first module arranged to monitor a bus associated with the buffer, and monitoring the buffer associated with the controller includes monitoring the bus using the first logic module included in the second cache.

16. The method of claim 11 wherein the second cache includes a first module arranged to monitor the buffer, and monitoring the buffer associated with the controller includes monitoring the bus using the first logic module included in the second cache.

17. A method for processing a packet, the method comprising:
obtaining information associated with the packet, wherein the information is obtained from a first cache, the first cache being separate from a controller, the controller being arranged to include a second cache, wherein the information is header information associated with the packet, and the first cache is arranged to store only the header information associated with the packet and header information associated with other packets;
determining whether to forward the packet using the information, the information being arranged to indicate a destination for the packet; and
forwarding the packet when it is determined that the packet is to be forwarded.

18. The method of claim 17 further including:
disposing of the packet when it is determined that the packet is not to be forwarded.

19. The method of claim 17 further including:
determining whether the packet is expired; and
disposing of the packet when it is determined that the packet is expired.

20. The method of claim 17 wherein the controller and the first cache are included within an access point.

21. The method of claim 17 wherein the controller is in direct communication with the first cache.

22. A system for processing a packet, the packet including at least a first bit, the system comprising:
means for causing a buffer associated with a controller to be monitored, the controller including a processor, a first cache, and a cache controller;
means for causing a determination to be made regarding when information associated with the packet is present within the buffer; and
means for causing a second cache to be updated using the information when it is determined that the packet is present within the buffer, the second cache being external to the controller, wherein the controller is in communication with the second cache and arranged to access the second cache to obtain the information in order to perform a function with the packet.

23. The system of claim 22 wherein the means for causing the second cache to be updated using the information includes means for causing at least the first bit to be written into the second cache.

24. The system of claim 22 wherein the second cache includes a random access memory and a tag bit, and the means for causing the second cache to be updated using the information includes means for causing at least the first bit to be written into the random access memory and updating the tag bit.

25. The system of claim 22 wherein the controller is arranged to access the second cache to obtain the information in order to determine whether to forward the packet or to dispose of the packet.

26. A system for processing a packet, the system comprising:
means for causing information associated with the packet to be obtained, wherein the information is obtained from a first cache, the first cache being separate from a controller, the controller being arranged to include a second cache, wherein the information is header information associated with the packet, and the first cache is arranged to store only the header information associated with the packet and header information associated with other packets;
means for causing a determination to be made regarding whether to forward the packet using the information, the information being arranged to indicate a destination for the packet; and
means for causing the packet to be forwarded when it is determined that the packet is to be forwarded.

27. The system of claim 26 further including:
means for causing the packet to be disposed when it is determined that the packet is not to be forwarded.

28. The system of claim 26 further including:
means for causing a determination to be made regarding whether the packet is expired; and means for causing the packet to be disposed of when it is determined that the packet is expired.

29. The system of claim 26 wherein the controller and the first cache are included within an access point.

* * * * *